United States Patent
De Soete et al.

(12) 
(10) Patent No.: US 6,322,835 B1
(45) Date of Patent: Nov. 27, 2001

(54) LOW DENSITY FRUCTAN COMPOSITION AND METHOD FOR PREPARING SAME

(75) Inventors: Johan De Soete, Bierbeek; Karl Booten, Geetbets; Luc Daenekindt, Gijzegem-Aalst, all of (BE)

(73) Assignee: Tiense Suikerraffinaderij N.V. (BE)

( * ) Notice: Subject to any disclaimer, the term of this patent is extended or adjusted under 35 U.S.C. 154(b) by 0 days.

(21) Appl. No.: 09/380,220

(22) PCT Filed: Jan. 30, 1998

(86) PCT No.: PCT/BE98/00015

§ 371 Date: Oct. 12, 1999

§ 102(e) Date: Oct. 12, 1999

(87) PCT Pub. No.: WO98/38223

PCT Pub. Date: Sep. 3, 1998

(30) Foreign Application Priority Data

Feb. 27, 1997 (EP) .................................................. 97870029

(51) Int. Cl.⁷ ................................. A23L 1/09; A23P 1/02
(52) U.S. Cl. ......................... 426/453; 426/455; 426/456; 426/471; 426/548; 426/639; 426/640; 426/658
(58) Field of Search .................................... 426/453, 455, 426/456, 471, 548, 658, 639, 640

(56) References Cited

U.S. PATENT DOCUMENTS

| | | | | |
|---|---|---|---|---|
| 2,782,123 | * | 2/1957 | Rubin | 426/548 |
| 3,746,554 | * | 7/1973 | Endicott | 426/548 |
| 4,303,684 | | 12/1981 | Pitchon et al. | 426/312 |
| 4,871,574 | * | 10/1989 | Yamazaki et al. | 426/471 |
| 5,425,961 | * | 6/1995 | Yatka et al. | 426/548 |
| 5,851,576 | * | 12/1998 | Abboud | 426/471 |

FOREIGN PATENT DOCUMENTS

| | | |
|---|---|---|
| 0036 738 B1 | 5/1984 | (EP) . |
| 0 440 074 A1 | 1/1991 | (EP) . |
| 0 657 106 B1 | 11/1994 | (EP) . |
| 0 692 252 A1 | 6/1995 | (EP) . |
| 2216 387 A | 10/1989 | (GB) . |
| 93/06744 | 4/1993 | (WO) . |
| 94/19973 | 9/1994 | (WO) . |
| 96/01849 | 1/1996 | (WO) . |

\* cited by examiner

*Primary Examiner*—Helen Pratt
(74) *Attorney, Agent, or Firm*—Hayes, Soloway, Hennessey, Grossman & Hage P.C.

(57) ABSTRACT

A low density fructan having a loose density equal or less than 0.35 g/ml to a composition which comprises intimately associated with the fructan one or more of maltodextrins, polydextrose, sucrose, polyols and high intensity sweeteners. Also provided is a method for preparing the fructan and the composition, and a composition which presents instant dispersion properties in aqueous medium.

4 Claims, No Drawings dry weight of the composition, the composition including a spray-dried mixture of 5 to 85 percent fructose, 5 to 60 percent dextrinized starch, and 0 to 80 percent sucrose.

LOW DENSITY FRUCTAN COMPOSITION AND METHOD FOR PREPARING SAME

FIELD OF THE INVENTION

The present invention is related to a spray-dried low density fructan composition, which preferably exhibits instant dispersion properties in an aqueous medium, and to a composition comprising it.

The present invention is also related to a process for preparing said compositions and to their use.

BACKGROUND OF THE INVENTION AND STATE OF THE ART

The U.S. Pat. No. 4,303,684 describes a rapidly soluble sweetener composition, its preparation process and improved dry beverages mixes employing it. The sweetener composition presents a low density and comprises a codried intimate mixture from 5 to 85 percent fructose, from 5 to 60 percent dextrinised starch and from 0 to 80 percent sucrose, all percentages being based on the dry weight of the composition.

The preparation process of said composition comprises:

preparing an aqueous solution comprising on dry solid bases the material indicated above, dispersing a gas into the solution, and drying the solution in the conditions effective to produce a porous product having the required density.

The obtained sweetener compositions have a wide range of utility, including all the applications in dry food mixes for which sucrose is normally used.

Such compositions could be used in a dry mix for forming a beverage, particularly a carbonated beverage.

British patent GB-2,216,387 describes a sweetener composition made of holospheroids or parts of said spheroids of microcrystalline sucrose, generally bound to crystal sucrose, and which may contain one or more high intensity sweeteners.

These sweetener compositions are prepared by spray drying of sucrose syrup with simultaneous injection of inert pressurised gas and generally contacting sprayed syrup during the spray drying step and/or after completion of said step, with crystals of sucrose and preferably by incorporating a high intensity sweetener in the syrup or in the agglomeration step.

The obtained sweeteners are characterised by a low density and could be used to replace ordinary granulated sucrose on a spoon-for-spoon basis.

These compositions are also used as carbohydrate carrier of a suitable bulk density, which is free from dust, is not easily eroded and has the functional properties necessary for food applications, while maintaining some of the visual characteristics of crystalline sugar, particularly the bright appearance or sparkle.

However, these products maintain high contents of sucrose or high calorific saccharides which present several drawbacks for the consumer.

At present, although less energy rich food is required, too much sugar and not enough food fiber are still being consumed.

Therefore, a great need still exists for food compositions which are balanced by a partial or even total replacement of sugar by "sugar substitutes", offering the taste and the physical properties of the traditional food compositions.

Among these "sugar substitutes", natural products like fructans, especially inulin, levan and fructo- oligosaccharides, have been developed for the replacement of sugar in a variety of products. Fructans like inulin or fructo-oligosaccharides are well known for their health improving effects, especially their advantageous nutritional properties favoring the proliferation of the useful intestinal flora (bifidobacteria sp. in particular), the reduction of cholesterol level in the body and providing a good fiber effect. In addition, those fructans are low caloric.

It is also known from the European patent application EP-0692252 that inulin or fructo-oligosaccharides or their derivatives could be used in a functional food or a medicament for carcinogenesis prevention and/or cancer treatment.

Also known is a soluble chicory extract prepared by spray-drying of an extract from roasted chicory roots, which contains about 22.5% weight of fructo-oligosaccharides (manufactured and commercialised by Leroux, France), and is suitable for application in various food preparations.

Inulin and fructo-oligosaccharides are still more expensive than sucrose which limits their general use by the consumer. However, in order to improve the health of the consumer, a daily intake of only low doses of these fructans is necessary.

The Japanese patent application JP-A-3290197 discloses a complex composition comprising sucrose, lactose, lacto-sucrose and/or a cyclodextrin containing starch.

AIMS OF THE INVENTION

The present invention aims to provide a fructan composition of low density which is easy to portion, to dose or to disperse.

Another aim of the present invention is related to a composition comprising said fructan composition.

A further aim of the invention is to provide an improved carrier for a high intensity sweetener which does not present the drawbacks of the carrier of the state of the art, which is low caloric, good for the health, and does not present an unpleasant aftertaste.

A specific aim of the invention is to provide a composition which exhibits instant dispersion in an aqueous medium.

A further aim of the present invention is to provide a composition which can be used as a substitute for the usual bulking agents such as, for example, polydextrose, but which has no unpleasant taste or aftertaste.

SUMMARY OF THE INVENTION

The present invention is related to a spray-dried fructan composition of low density, i.e. said composition having a density (loose) equal or less than 0.35 g/ml, advantageously from 0.08 to 0.30 g/ml, preferably 0.1 to 0.2 g/ml. The fructan composition may consist of one or more homodispersed fructans and/or polydispersed fructans, or any mixture thereof.

Advantageously, the fructans, which can be linear or branched, are chosen among the group consisting of inulin from a non-roasted inulin source, levan, fructo-oligosaccharides and/or derivatives thereof.

Derivatives from inulin, levan, fructo-oligosaccharides are derivatives comprising a chemical modification while the fructosyl-fructose linkages are maintained and wherein the chemical modification takes place in one or more than 3 free OH groups of the fructose, respectively linked to the $C_2$, $C_3$ or $C_6$ atoms of the backbone fructose molecule. This chemical modification on the free OH groups can be obtained for example by an esterification reaction like the one described in the International Patent Application WO96/01849.

These derivatives are preferably the derivatives described in the documents EP-0657106 and EP-0440074.

According to a preferred embodiment, the composition according to the invention is a composition which comprises intimately associated with the fructan, one or more elements chosen among the group consisting of maltodextrins, polydextrose, sucrose, polyols and high intensity sweeteners. The high intensity sweetener is preferably chosen among the group consisting of aspartame, acesulfame-K, sucralose, saccharin, stevioside, cyclamate, alitame, neohesperidine dihydrochalcone (NHDC), SWEETENER 2000® (Nutrasweet Company) or a mixture thereof.

SWEETENER 2000® is believed to be a high intensity sweetener composed of aryl urea derivatives and tri-substituted guanidines, a detailed chemical identity which is not known at the present time.

Preferably, in the composition, the weight ratio of fructan to the said one or more elements chosen from the group consisting of maltodextrins, polydextrose, sucrose and polyols may range from 99/1 to 1/99 whereas the high intensity sweetener or mixture of high intensity sweeteners may be present in a concentration from 0.01% to 20%, preferably from 0.05% to 10% and more preferably from 0.1% to 5% (weight % based on the total weight of the composition being 100%).

Another aspect of the present invention is related to an agglomerated composition comprising one of the above-described fructan compositions, which exhibits instant dispersion properties in an aqueous medium.

In the present case, "instant dispersion properties" is understood to mean the fact that the said composition becomes immediately and therefore instantly dispersed when brought in contact with an aqueous medium in concentration regions below as well as above the solubility point.

Preferably, said composition which exhibits instant dispersion properties in an aqueous medium is an "agglomerated composition" which is preferably obtained by the process described in the International Patent Application WO94/19973 incorporated hereafter by reference. Preferably, the process should be the one described in claim 4 of the International Patent Application WO94/19973.

An "agglomerated composition" is understood to mean the product which results from the agglomeration performed on a product already in powdered form in order to increase the particle size of said powdered product (such as the low density fructan composition according to the present invention).

Another aspect of the present invention is related to a preparation process of the spray-dried fructan composition according to the invention, which comprises the following steps:

preparing a suspension of fructan or mixture of fructans in an aqueous medium optionally in the presence of one or more elements chosen among the group consisting of maltodextrins, polydextrose, sucrose, polyols and high intensity sweeteners, dispersing an inert gas (such as $CO_2$) into the suspension, and spray-drying the suspension under the conditions effective to produce a fructan composition having the required density (loose) equal or less than 0.35 g/ml, preferably from 0.08 to 0.30 g/ml, more preferably from 0.1 to 0.2 g/ml.

The said suspension of fructan or mixture of fructans in an aqueous medium has a fructan concentration from 10 to 80% weight dry fructan substance, and its temperature is kept below the solution point of the fructan or mixture of fructans.

In order to obtain a composition according to the invention which exhibits instant dispersion properties in an aqueous medium, said preparation process comprises the additional steps of:

treating the fructan composition present in a powdered form or a granular form, with the aid of water in the liquid phase, an aqueous solution or suspension of the fructan and/or one or more of the above defined other elements with one or more of said other elements in a powdered form or with water in the vapor phase, in an agglomeration chamber in the presence of hot air, and optionally of water vapor to form the agglomerated composition; and cooling and sieving the agglomerated composition in order to retain the product of suitable particle size, while recycling those composition particles which are too fine and those which are oversized.

The latter process steps are described in detail in the International Patent Application WO94/19973, incorporated hereafter by reference.

A further aspect of the present invention is related to the use of the low density fructan composition according to the invention for the preparation of a food, a feed or an ingredient for the preparation of a food or feed composition, having interesting nutritional properties, such as for example, a spoon for spoon sugar replacer and a table top sweetener. The low density fructan composition according to the invention can also be used as a carrier for various products such as e.g. high intensity sweeteners, drugs, flavours, colours and enzymes.

The present invention will be described in detail with reference to the examples for the illustration of the present invention.

EXAMPLE 1

Preparation of Low Bulk Density Fructan Composition

A 39% weight dry substance suspension in water of fructan RAFTILINE® ST (inulin from chicory, average degree of polymerisation (DP) of 10, produced by ORAFTI, Belgium) was prepared by bringing the fructan in suspension under stirring into water of about 60° C. and the suspension was brought by heating to a temperature of 50 to 55° C. Accordingly $CO_2$ was added to the suspension (about 5.2 g $CO_2$/kg suspension), and then it was fed into a fluidised spray dryer of the MSD-20 type in which the main air is introduced through the ceiling around the spray nozzles. The feed system comprises a buffer tank from which the feed goes through a small Mono pump, and a unit where the $CO_2$ is added in line, to a large Mono pump, after which the feed is atomised by means of a high pressure nozzle.

The spray drying conditions used are as follows:

temperatures:

air in ($T_{IN}$): 227–230° C.

air out ($T_{OUT}$): 107–110° C.

ingoing air of the static fluidised bed ($T_{SFB\ IN}$): 58–67° C.

powder in the static fluidised bed ($T_{SFB\ POWDER}$): 69–71° C.

atomisation pressure: $22.10^5$ Pa (22 bar)

When leaving the static fluidised bed (SFB), the powder passes two 0.3 m² vibrating fluid beds for further drying and final cooling before it is bagged.

The bulk density of the spray dried product so obtained was 0.19 g/ml (loose density) and 0.21 g/ml (100×tapped).

In the said two Vibro Fluidizers (SFB units) the airflow was adjusted in order to blow off some of the fines which were reinjected in the jet stream of the nozzle.

What is claimed is:

1. A process for the preparation of a spray dried fructan which comprises the following steps:

preparing a suspension of fructan or mixture of fructans in an aqueous medium, dispersing an inert gas into the suspension, and spray-drying the suspension under the conditions effective to produce a fructan having a density (loose) equal or less than 0.35 g/ml.

2. Preparation process according to claim 1, which further comprises the steps of:

treating the fructan present in a powdered form or a granular form, with the aid of water in the liquid phase, an aqueous solution or suspension of the fructan and/or one or more elements chosen among the group consisting of maltodextrins, polydextrose, sucrose, polyols and high intensity sweeteners, or with one or more of said elements in powdered form or with water in the vapor phase, in an agglomeration chamber in the presence of hot air, and optionally of water vapor to form the agglomerated composition; and cooling and sieving the agglomerated fructan or composition in order to retain the product of suitable particle size, while recycling those particles which are too fine and those which are oversized.

3. A process for the preparation of a spray dried fructan composition which comprises the following steps:

preparing a suspension of fructan or mixture of fructans in an aqueous medium in the presence of one or more elements chosen among the group consisting of maltodextrins, polydextrose, sucrose, polyols and high intensity sweeteners, dispersing an inert gas into the suspension, and spray-drying the suspension under the conditions effective to produce a fructan composition having a density (loose) equal or less than 0.35 g/ml.

4. Preparation process according to claim 3, which further comprises the steps of:

treating the composition present in a powdered form or a granular form, with the aid of water in the liquid phase, an aqueous solution or suspension of the fructan and/or one or more elements chosen among the group consisting of maltodextrins, polydextrose, sucrose, polyols and high intensity sweeteners, or with one or more of said elements in powdered form or with water in the vapor phase, in an agglomerated chamber in the presence of hot air, and optionally of water vapor to form the agglomerated composition; and cooling and sieving the agglomerated fructan or composition in order to retain the product of suitable particle size, while recycling those particles which are too fine and those which are oversized.

* * * * *